US010977210B2

(12) United States Patent
Chandan et al.

(10) Patent No.: US 10,977,210 B2
(45) Date of Patent: Apr. 13, 2021

(54) METHODS FOR IMPLEMENTING AN ADMINISTRATION AND TESTING TOOL

(71) Applicant: JPMorgan Chase Bank, N.A., New York, NY (US)

(72) Inventors: Sandeep Chandan, Wheeling, IL (US); Nicholas Meiborg, Chicago, IL (US); Brianna Russell, Chicago, IL (US); Willie Baxter, Cicero, IL (US); Jason Kettner, Chicago, IL (US); Tina Ehlizevak, Chicago, IL (US); Akshay Sadashiv Apte, Wheeling, IL (US); Harin Patel, Carol Stream, IL (US); Brian J. Tanquary, Batavia, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 242 days.

(21) Appl. No.: 16/196,852

(22) Filed: Nov. 20, 2018

(65) Prior Publication Data
US 2020/0159693 A1    May 21, 2020

(51) Int. Cl.
G06F 16/11      (2019.01)
G06F 16/25      (2019.01)
G06F 11/14      (2006.01)
H04L 12/24      (2006.01)
G06F 16/17      (2019.01)
H04L 29/08      (2006.01)

(52) U.S. Cl.
CPC ........ G06F 16/113 (2019.01); G06F 11/1402 (2013.01); G06F 16/1734 (2019.01); G06F 16/254 (2019.01); H04L 41/5074 (2013.01); H04L 67/06 (2013.01)

(58) Field of Classification Search
None
See application file for complete search history.

(56) References Cited

U.S. PATENT DOCUMENTS

| 10,585,877 | B1* | 3/2020 | Casazza ................. G06F 16/24 |
| 2009/0075655 | A1* | 3/2009 | Dobson .............. H04L 41/5009 455/436 |
| 2013/0208880 | A1* | 8/2013 | Lovy ..................... H04L 43/045 379/265.03 |
| 2014/0079297 | A1* | 3/2014 | Tadayon ............ G06K 9/00288 382/118 |
| 2017/0235848 | A1* | 8/2017 | Van Dusen ........... G06F 16/904 705/12 |
| 2018/0027006 | A1* | 1/2018 | Zimmermann ..... H04L 63/0245 726/11 |
| 2018/0366021 | A1* | 12/2018 | Zertuche ................. G06F 40/40 |
| 2019/0027006 | A1* | 1/2019 | Eyring ............. G08B 13/19695 |
| 2019/0213504 | A1* | 7/2019 | Vasseur .................. H04L 41/16 |
| 2019/0266132 | A1* | 8/2019 | Rubenstein ........... G06F 9/4881 |
| 2019/0332508 | A1* | 10/2019 | Goyal ................. G06F 11/0757 |
| 2020/0277847 | A1* | 9/2020 | Rojas ..................... G05B 19/05 |

* cited by examiner

Primary Examiner — Wilson Lee
(74) Attorney, Agent, or Firm — Hunton Andrews Kurth LLP

(57) ABSTRACT

The invention relates to implementing an administration and testing tool. An embodiment of the present invention is directed to implementing and using a server-less batch process architecture that provides a customized web interface for managing batch jobs and file archival within a cloud environment.

20 Claims, 5 Drawing Sheets

| | | 510 | 512 | 514 | 516 | 518 | 520 |
|---|---|---|---|---|---|---|---|
| No. | Job Name | Errors | Status | Job Start Time(EST) | Job End Time(EST) | | Service Ticket # |
| 1 | LYNX_Extract | 0 | end | 2018-06-18 15:20:37 | 2018-06-18 15:27:53.341 | | |
| 2 | LYNX_Extract | 1 | end | 2018-06-18 12:14:37 | 2018-06-18 12:18:14.581 | | 1234567 |
| 3 | JPM_Extract | 0 | end | 2018-06-18 10:49:37 | 2018-06-18 10:49:42.939 | | |
| 4 | CUSIP_Extract | 0 | end | 2018-06-18 10:29:37 | 2018-06-18 10:29:39.755 | | |
| 5 | LYNX_Extract | 0 | end | 2018-06-18 10:28:38 | 2018-06-18 10:32:15.818 | | |
| 6 | CUSIP_Extract | 0 | end | 2018-06-18 10:23:37 | 2018-06-18 10:23:38.605 | | |
| 7 | LYNX_Extract | 0 | end | 2018-06-18 10:22:38 | 2018-06-18 10:26:13.055 | | |
| 8 | CUSIP_Extract | 0 | end | 2018-06-18 10:21:37 | 2018-06-18 10:21:38.388 | | |
| 9 | CUSIP_Extract | 0 | end | 2018-06-18 10:14:37 | 2018-06-18 10:14:39.208 | | |

Figure 5

METHODS FOR IMPLEMENTING AN ADMINISTRATION AND TESTING TOOL

FIELD OF THE INVENTION

The invention relates generally to a method for implementing an administration and testing tool that monitors and manages various jobs and tasks.

BACKGROUND OF THE INVENTION

Many applications require daily loading of data to function. This is usually implemented with a physical or virtual batch server that executes scripts to read data from files and persist the data to a database. However, current systems require use of a third party scheduling tool and a specialized server to function. These resources have costs which are paid by the application whether the batch job is actively running or not. Moreover, current solutions may be difficult to monitor and maintain as files can be coming from multiple disparate source systems and further require dozens of steps to process. When a failure occurs, current solutions do not provide a mechanism to properly addressing and remedying the failure.

These and other drawbacks currently exist.

SUMMARY OF THE INVENTION

According to one embodiment, the invention relates to a method of implementing an Administration and Testing Tool. The method comprises the steps of: retrieving, at a batch server, data from a plurality of sources of data; performing a transformation of the data to a cloud storage service; monitoring status of a plurality of jobs and files during the transformation of the data; detecting an error and associated error specifics for at least one step during the transformation of the data; identifying a corresponding action to address the error; and generating an interactive user interface that displays the corresponding action and further comprises a monitoring panel and a management panel.

The computer implemented method described herein provides unique advantages to software developers, administrators and other users, according to various embodiments of the invention. An embodiment of the present invention is directed to implementing a reusable framework that is easily extensible for changing data requirements. The method may use a standard firm-wide toolset that is Java developer friendly and eliminates a need for shell scripting or specialized extract transform load (ETL) knowledge. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 5 illustrates an exemplary screenshot of a user interface of an Administration Testing Tool, according to an exemplary embodiment.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs. While certain nomenclature and types of applications/hardware are described, other names and application/hardware usage is possible and the nomenclature provided is done so by way of non-limiting examples only. The figures provide additional exemplary details regarding the present invention. It should also be appreciated that these exemplary embodiments are provided as non-limiting examples only.

An embodiment of the present invention is directed to implementing and using a server-less batch process architecture that provides a customized web interface for managing batch jobs and file archival within a cloud environment. According to an embodiment of the present invention, an open source framework, such as Pentaho, may be leveraged to perform data loading tasks and a cloud storage service may be used to store files. Other frameworks may be used. An embodiment of the present invention inspects status of jobs and files and further tracks the location of the files. A customized web interface may provide detailed transformation logging on a per file or other basis. The interface may also allow an operator or other user to pause and retry jobs as needed. For example, when jobs fail, the tool may automatically open a service manager ticket and communicate details of the error and further provide a link to possible solutions and options.

An embodiment of the present invention provides the ability to view various levels of file processing details in an interactive interface while integrating with other tools, such as an issue management tool, a service manager tool, communication systems, etc.

An embodiment of the present invention is directed to transitioning extract transform load (ETL) processing from a traditional batch model to a cloud based solution. The innovative method is directed to improving maintainability and simplifying system monitoring.

Figure 1:
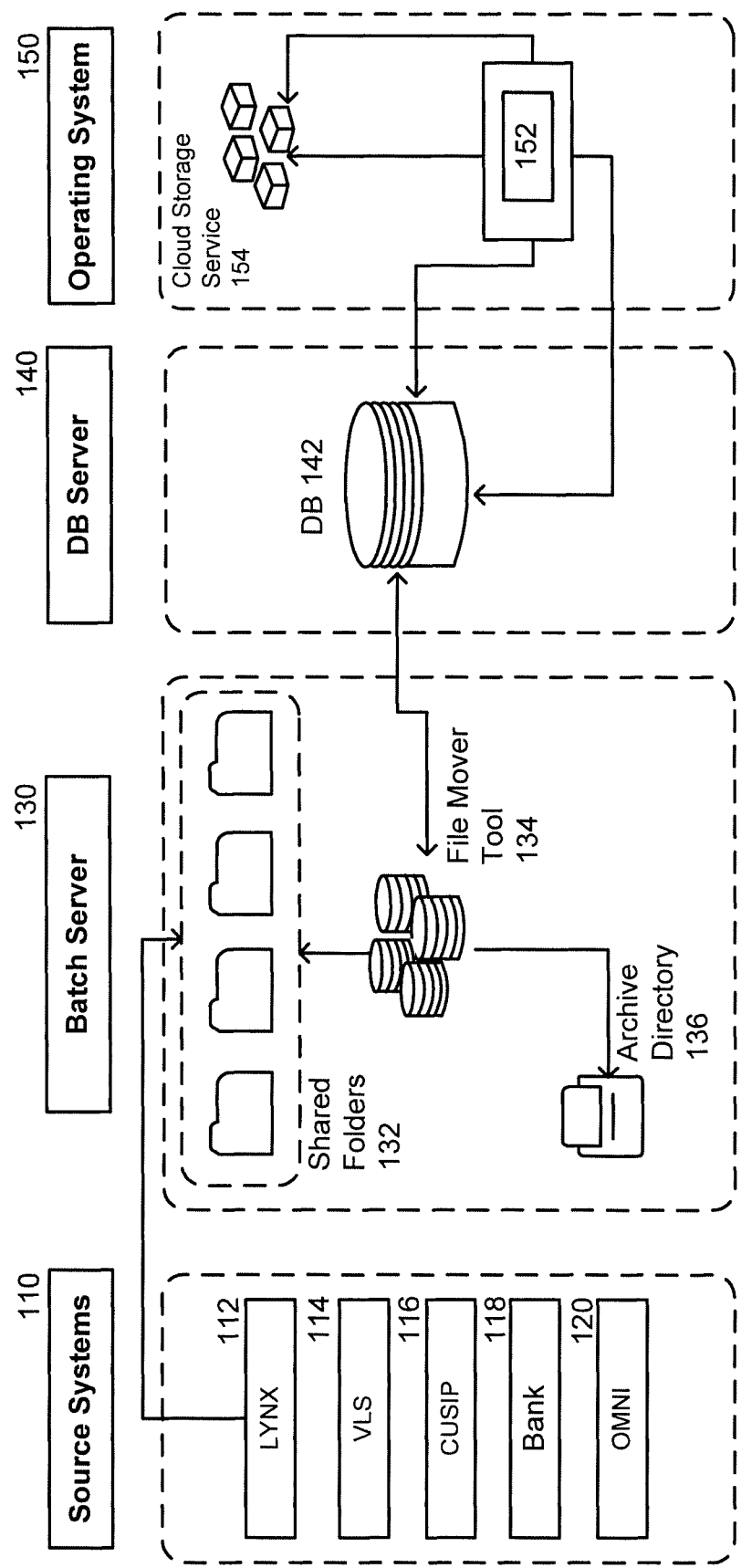
FIG. 1 is an exemplary system that implements a server-less batch processing solution, according to an embodiment of the present invention.

FIG. 1 is an exemplary system that implements a server-less batch processing solution, according to an embodiment of the present invention. As shown in FIG. 1, data from Source Systems 110 may be uploaded to a Batch Server 130. Source Systems 110 may include various external and internal sources of data represented by 112, 114, 116, 118 and 120. Batch Server 130 may include Shared Folders 132, File Mover Tool 134 and Archive Directory 136. File Mover Tool 134 may transmit files to Database 142 which may be hosted by Database Server 140. Operating System 150 may include a business intelligence software 152 and a cloud storage service 154. Business intelligence software 152 may provide data integration, OLAP services, reporting, data mining and ETL functions. Data from Business intelligence software 152 may be transmitted to Cloud Storage Service 154. The components illustrated in FIG. 1 are merely exemplary. Other architectures may be supported. While a single component is shown, multiple components may be realized.

Figure 2:
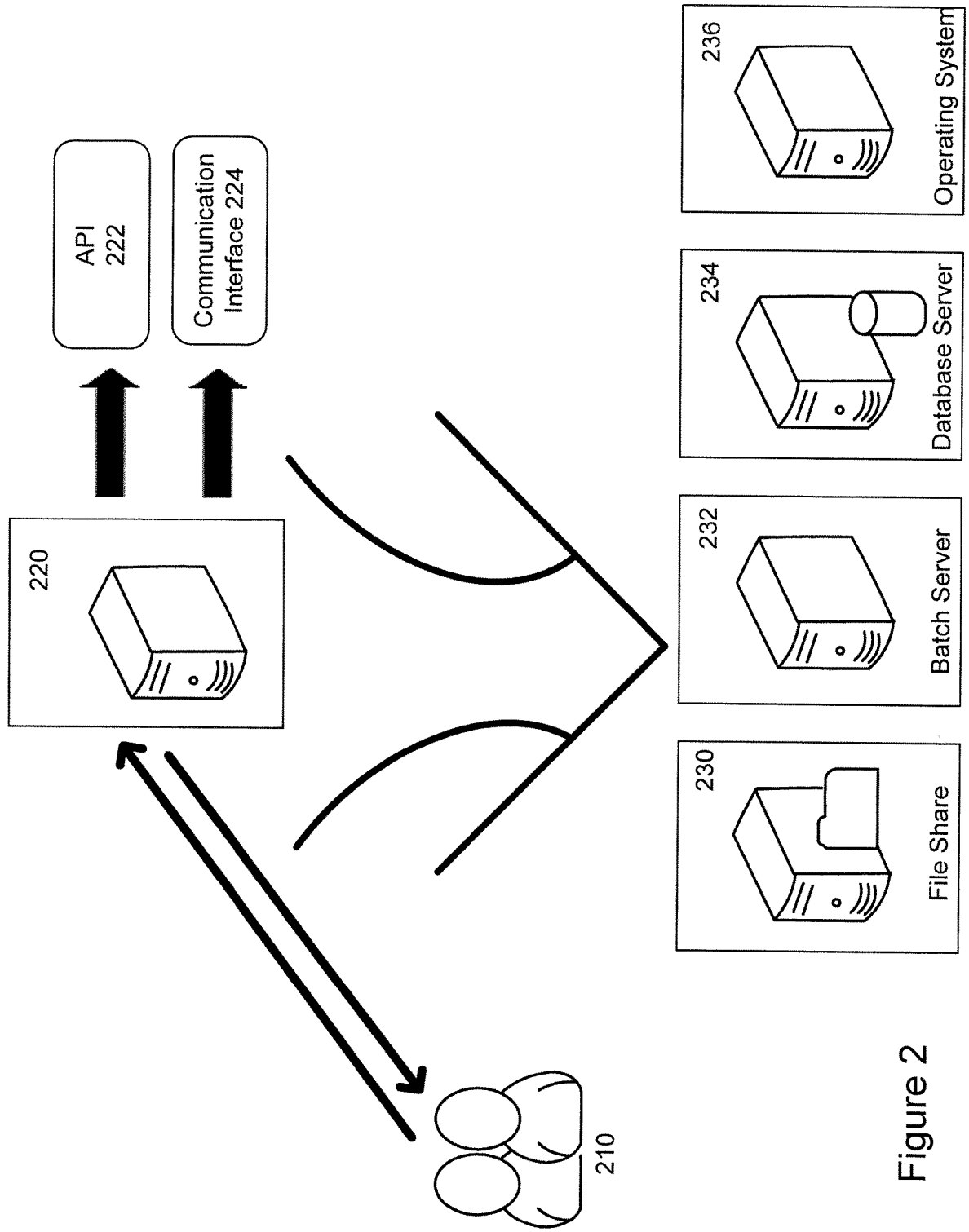
FIG. 2 is an exemplary overview and implementation diagram, according to an embodiment of the present invention.

FIG. 2 is an exemplary overview and implementation diagram, according to an embodiment of the present invention. An Administration and Testing Tool 220 may receive user input and provide notifications to team members in the event of a failure or other issue. Users and team members may be represented by 210. Administration and Testing Tool 220 may be integrated with other service manager tools, via an API 222 or other interface. Administration and Testing Tool 220 may also communicate via communication interface 224 which represents various channels, such as email, text message, SMS, interactive interface, portal, etc. Administration and Testing Tool 220 may monitor status of jobs and files where logs and file process status data may be available through an interface of Administration and Testing Tool 220. As shown in FIG. 2, Administration and Testing Tool 220 may further be integrated with a file share system 230, batch server 232, database server 234 and an operating system 236 as well as other systems and servers.

Figure 3:
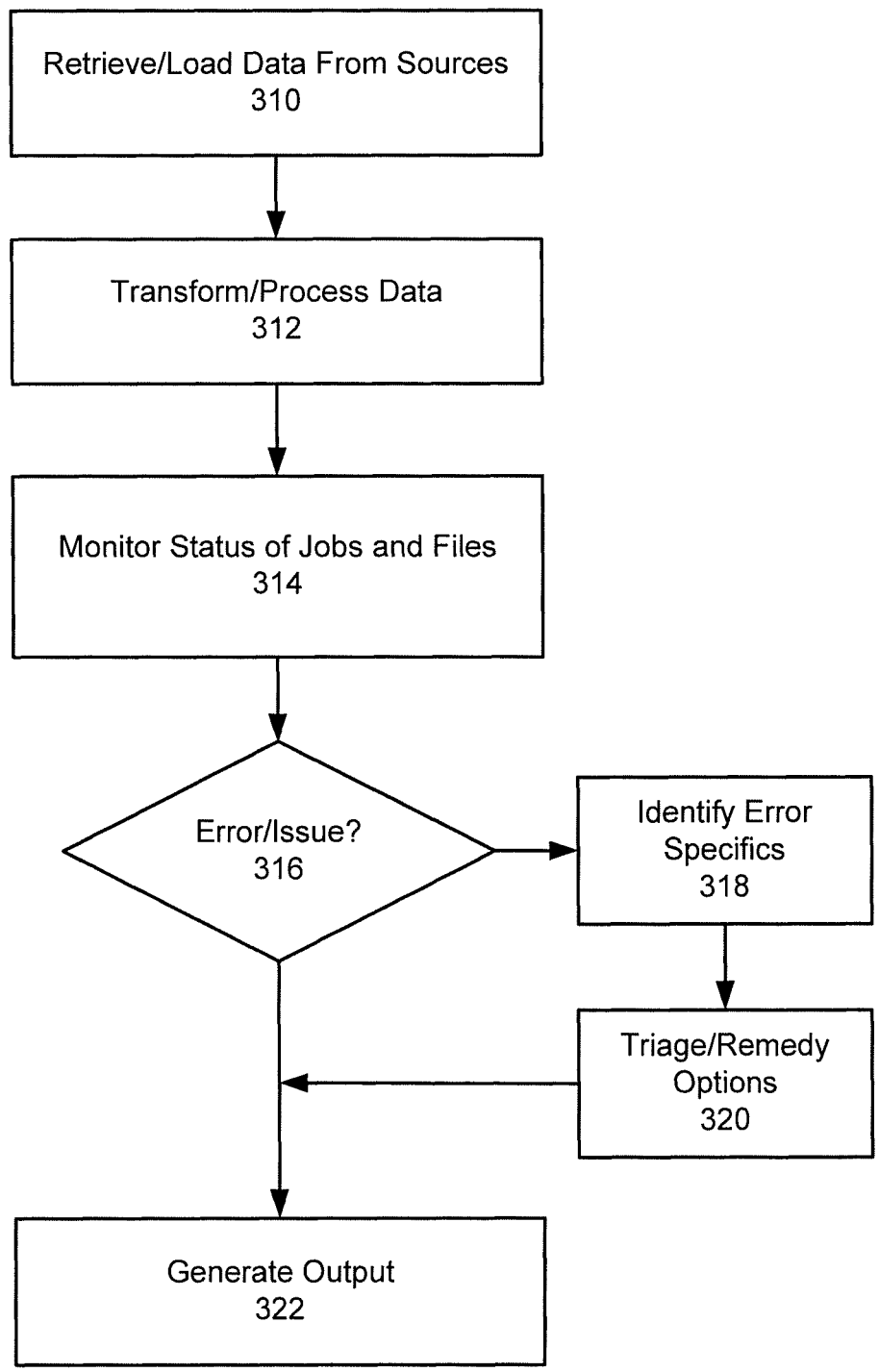
FIG. 3 illustrates an exemplary flowchart for implementing an Administration Testing Tool, according to an embodiment of the present invention.

FIG. 3 illustrates an exemplary flowchart for implementing an Administration Testing Tool, according to an embodiment of the present invention. At step 310, data from various sources may be retrieved and/loaded. At step 312, the data may be transformed and/or otherwise processed. At step 314, status of jobs and files may be monitored. At step 316, the system may identify or detect an error or other issue. If an error or issue is detected, the system may identify error specifics at step 318. At step 320, remedy options and/or suggestions may be provided and/or automatically implemented. An output for display on an interactive user interface may be provided, at step 322. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

At step 310, data from various sources may be retrieved and/loaded. Data sources may include internal sources as well as external sources.

At step 312, the data may be transformed and/or otherwise processed. The data may be transformed and business logic may be applied to the data. For example, the data received may need to be transformed into a file structure that is compatible with a database. This may involve 50, 60 or even hundreds of steps to get data from one system into another system.

At step 314, status of jobs and files may be monitored. Various features may be monitored by an embodiment of the present invention. For example, monitored data may include data from a source system, job status (e.g., processed, complete, stuck, etc.), location of file in a current flow, file name, file size, etc.

At step 316, the system may identify or detect an error or other issue. If an error or issue is detected, the system may identify error specifics at step 318. If an error or issue is detected, the system may identify corresponding details. This may include a ticket number associated with an integrated service manager tool or other system. The details may also include a list of all the steps that the file went through. For each step, the system may provide an indicator. For example, a green icon may indicate the step was successfully executed while a red icon may indicate that the step was not executed. Other indicators may provide other notifications to the user. For example, if a step has a red icon, by clicking on the icon, additional details may be displayed. In this example, the system may provide an exact line of code that corresponds to the error and also the data that was processed during the error. Accordingly, the system enables the user to pinpoint the failure. These details may be provided via a link or other indicator.

At step 320, remedy options and/or suggestions may be provided. The system may enable a user to identify an issue and a corresponding action. The action may include reprocessing the file, retrying the job and/or other action specific to the error or issue. Reprocessing the file may include initiating a job from the beginning. If an error was not found in the file itself (but an error still occurred), the system may reprocess the file from an archive or other source. The system may then retrieve a last file that was processed and retry it through the steps again. Other actions to address an error or issue may be identified and automatically applied.

An output for display on an interactive user interface may be provided, at step 322. The output may provide various functions and features, including monitoring functions and management functions.

Figure 4:
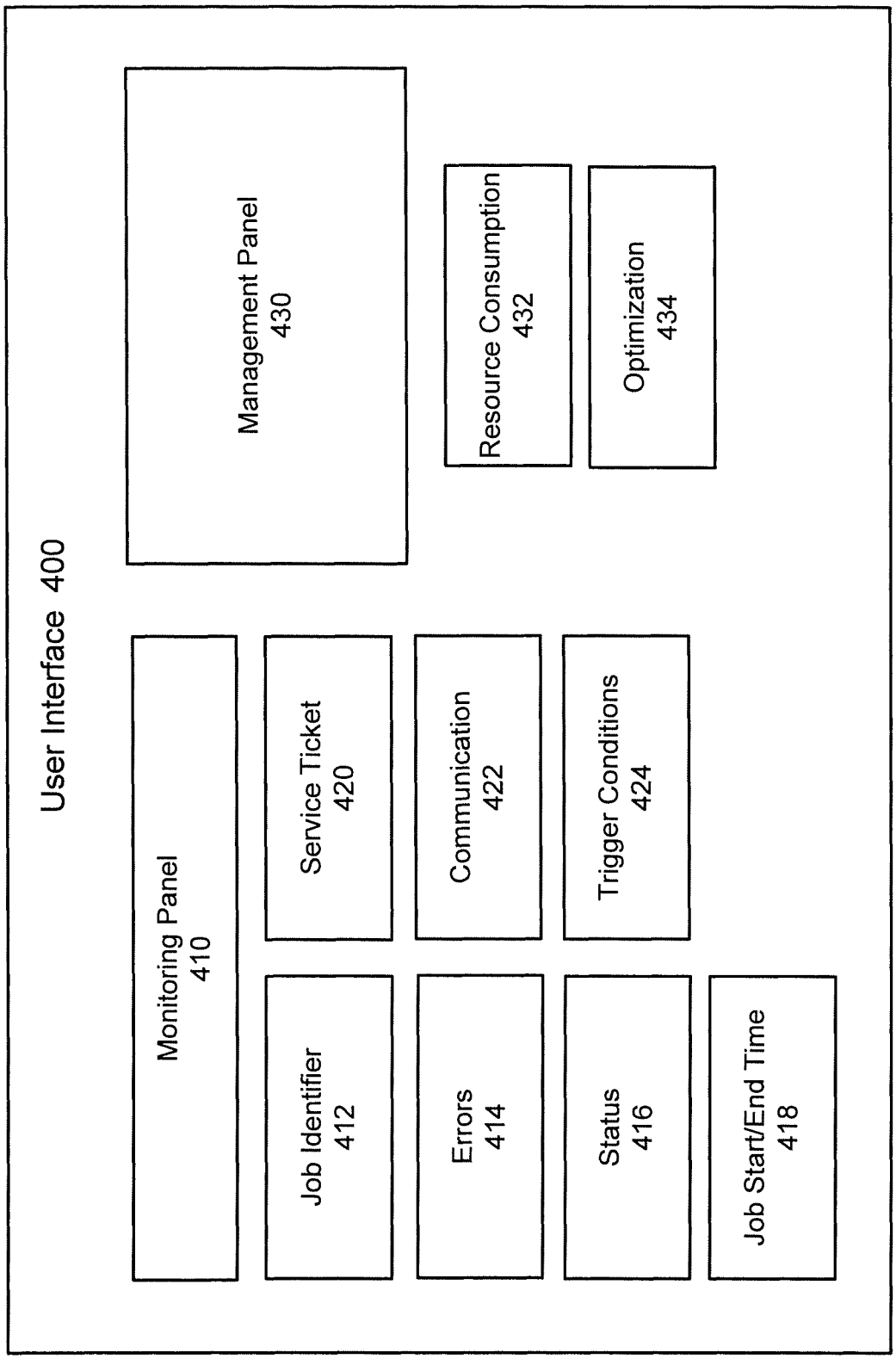
FIG. 4 illustrates an exemplary interface of an Administration Testing Tool, according to an exemplary embodiment.

FIG. 4 illustrates an exemplary interface of an Administration Testing Tool, according to an exemplary embodiment. As shown in FIG. 4, an Interface may include functionality directed to monitoring and management functions. Monitoring Panel 410 may provide various monitoring related functions. For example, the user interface may provide interactive data and details as represented by Job Identifier 412, Errors 414, Status 416, Job Start and End Time 418, Service Ticket 420, Communication 422 and Trigger Conditions 424.

Job Identifier 412 may include a unique identifier. Errors 414 may represent a number of errors and/or other quantitative data relating to the errors. Status 416 may include progress information of a job. Job Start and End Time 418 may provide a time period or specific day/time and may further include a stage or other step in a process. Service Ticket 420 may include a link to an integrated service manager tool and/or other tool or system. Communication 422 may represent a communication interface that generates a notification indicating a failed execution, incomplete process, etc. Trigger Conditions 424 may represent conditions and/or factors that form the basis for a notification. For example, Trigger Conditions may include an email trigger interval, a ticket creation interval, etc.

Management Panel 430 may enable users to manage and optimize the monitored and other data. For example, the user interface may provide details relating to Resource Consumption 422 and Optimization 434. An embodiment of the present invention may also provide information concerning resources being consumed. This may include memory consumption, CPU processing and/or types of resources. This information may then be used to provide optimization and efficiency features.

An embodiment of the present invention is directed to a cloud based environment. An embodiment of the present invention may be applied to various types of applications. For example, an entity may manage commercial lending information and track borrowers compliance with loan agreements. With such a system, data may be gathered from various different sources. The processing may involve many different steps and functions. Managing the sources and processing steps is a complex and involved process. An embodiment of the present invention is directed to determining whether the process is successful or not and if a step or function has failed, determining a reason for failure, how the failure occurred, etc. An embodiment of the present invention is directed to an Administration and Testing tool that enables users to monitor and manage various processes and view status of jobs from many different sources.

FIG. 5 illustrates an exemplary screenshot of a user interface of an Administration Testing Tool, according to an exemplary embodiment. As shown in FIG. 5, an interactive user interface may include a logger dashboard. Details concerning a job name 510, errors 512, status 514, job start time 516, job end time 518 and service ticket number 520 may be provided. In this example, job name 510 may include an identifier of the job. Errors 512 may indicate a number of errors for the associated job. Status 514 may include end, in progress, not started, etc. Timing data may also be provided, as shown by 516 and 518. For each error or group of errors, a link to a service ticket may be provided at 520. Additional metrics and data may also be provided.

An embodiment of the present invention is directed to integration with a production ticketing system as well as other service manager systems. The production ticketing system may detect an error and provide details that pinpoint the error to facilitate addressing and remedying the detected error. Details may include specifics concerning the file, step or function, location associated with the error. The system may further provide the ability to correct the error as well as retry the job. Other options may be provided. In addition, the system may automatically notify a team, system and/or person. The notification may provide details of the error in an electronic communication with instructions on how to remedy the error. The instructions may be based on prior errors having similar or corresponding characteristics. In addition, a learning algorithm or other machine learning capabilities may be applied to facilitate remedy of the error.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 120, 130 or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as a web-based system, other embodiments of the invention can be implemented using similar technologies, such as transmission of data that is displayed using an existing web browser on a user's mobile device and using a software application ("app") downloaded onto a user's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer implemented method for providing an Administration and Testing Tool, the method comprising the steps of:
   retrieving data from a plurality of internal and external sources of data;
   loading, into a batch server, the data;
   processing the data by transforming it to a file structure that is compatible with a cloud storage service;
   monitoring status of a plurality of batch processing jobs and files during the transformation of the data, including a job status and a file location in a current job flow;
   detecting, based on the monitoring status of a plurality of batch processing jobs and files, an error and associated error specifics for at least one step during the transformation of the data, the error specifics including a ticket number associated with an integrated service manager tool;
   identifying a corresponding action to address the error, the action comprising reprocessing a file associated with the detected error and retrying a batch processing job associated with the detected error; and
   generating an interactive user interface that displays the corresponding action and further comprises a monitoring panel and a management panel.

2. The method of claim 1, wherein the plurality of sources of data comprises internal sources and external sources.

3. The method of claim 1, wherein the transformation of the data further comprises applying business logic to the data.

4. The method of claim 1, wherein the transformation of the data further comprises transforming the data into a file structure compatible with a database.

5. The method of claim 1, wherein the status represents job status comprising one of: processed, complete and stuck.

6. The method of claim 1, wherein the status represents location of a file in a current flow.

7. The method of claim 1, wherein the associated error specifics comprise a series of steps that a file went through.

8. The method of claim 1, wherein the associated error specifics comprise a line of code that corresponds to the error.

9. The method of claim 1, wherein the corresponding action comprises reprocessing the file.

10. The method of claim 1, wherein the corresponding action comprises retrying the job.

11. The method of claim 1, wherein the corresponding action comprises pausing the job.

12. The method of claim 1, wherein the interactive user interface comprises a monitoring panel that further comprises a job identifier, a number of errors, job status, job start time and job end time.

13. The method of claim 11, wherein the management panel comprises a resource consumption module and an optimization module.

14. The method of claim 1, further comprising the step of: integrating with a service manager tool.

15. The method of claim 14, wherein the service manager tool comprises a production ticketing system.

16. The method of claim 14, wherein responsive to the error being detected, an electronic notification is automatically transmitted to notify a team of the error.

17. The method of claim 14, wherein responsive to the error being detected, one or more remedial options are automatically generated based on one or more prior errors and remedies.

18. The method of claim 1, wherein the batch server comprises shared folders, a file mover tool and an archive directory.

19. The method of claim 1, wherein the Administration and Testing Tool is implemented on a server-less batch process architecture.

20. The method of claim 1, wherein the Administration and Testing Tool is implemented on an open source framework.

* * * * *